United States Patent [19]

Babcock

[11] Patent Number: 5,649,802

[45] Date of Patent: Jul. 22, 1997

[54] TRAILER FRAME AND INDEPENDENT WHEELS

[76] Inventor: James S. Babcock, Box 367 Verona, Ontario, Canada, K0H 2W0

[21] Appl. No.: 674,333

[22] Filed: Jul. 1, 1996

[51] Int. Cl.$^6$ ...................................................... B60P 1/28
[52] U.S. Cl. ............................................................ 414/483
[58] Field of Search .................................... 414/480, 482, 414/483, 484, 485

[56] References Cited

U.S. PATENT DOCUMENTS

| | | | |
|---|---|---|---|
| 2,822,100 | 2/1958 | Pesta | 414/482 |
| 2,856,091 | 10/1958 | Johnson | 414/483 |
| 3,065,993 | 11/1962 | Schramm | 414/483 |
| 5,308,213 | 5/1994 | Gilbertson | 414/483 |
| 5,474,416 | 12/1995 | Rogge et al. | 414/482 |
| 5,564,883 | 10/1996 | Swanner | 414/483 |

Primary Examiner—Thomas J. Brahan

[57] ABSTRACT

A trailer frame and independent wheels including a stationary frame member with a tongue assembly attached and a pair of side bars with each side bar having a free end. Included is a movable frame member being positionable juxtapose the stationary frame member. The movable frame has a front bar and a pair of side bars and each side bar has a rear end. A pair of vertical supports project upwardly from an upper side of the movable frame member. A pair of wheel assemblies, with one each attached to one of the side bars of the movable frame member. Each wheel assembly having an axle arm with an interior end that is coupled between a pair of axle plates. The pair of axle plates are welded to the movable frame member and coupled to the free end of the stationary frame. A hub of each wheel assembly supports a tire rim with a tire. A pair of elongated suspension bands are provided. Each has an upper end bolted to the side bar of the movable frame and a lower end welded to the axle arm.

15 Claims, 4 Drawing Sheets

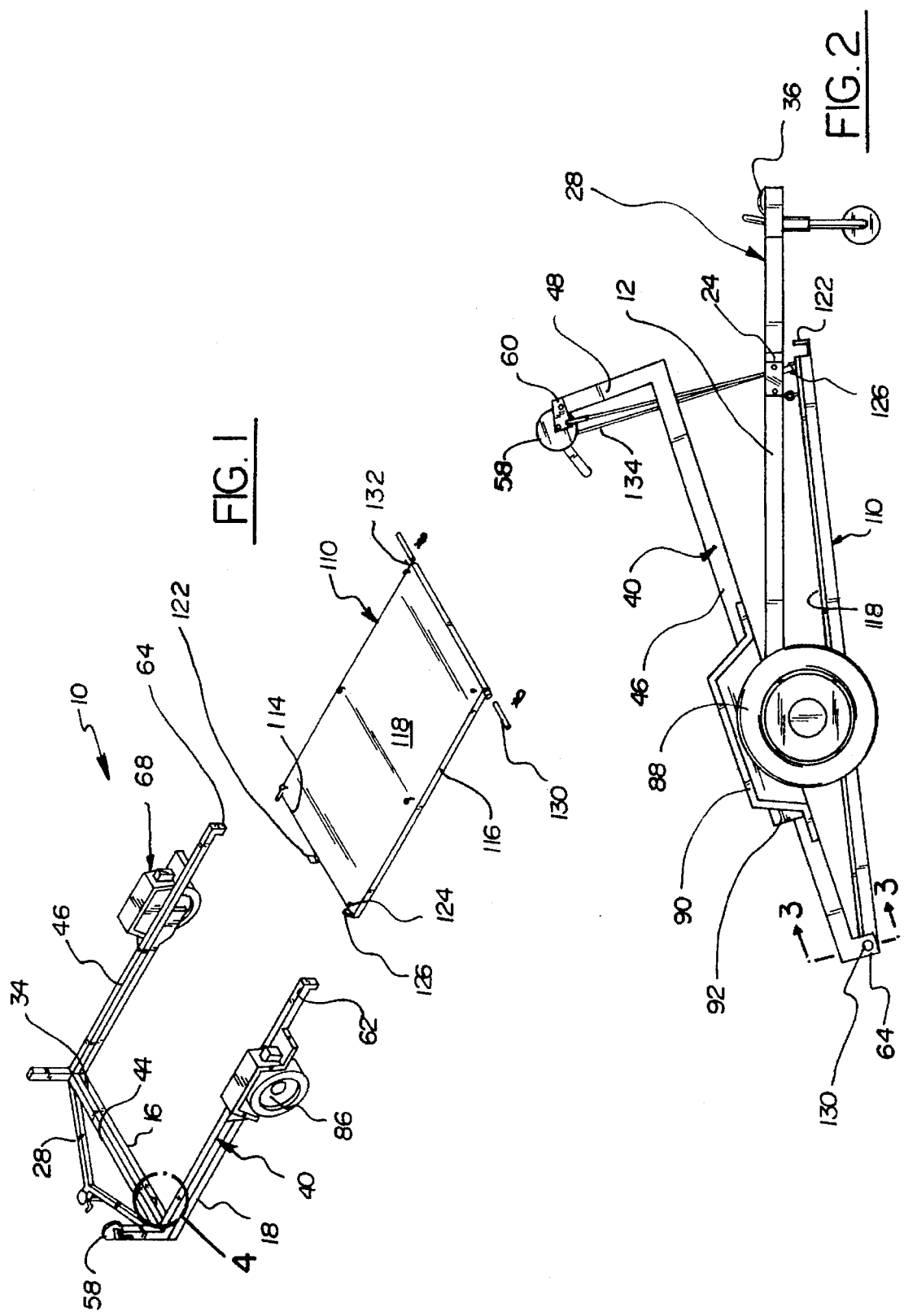

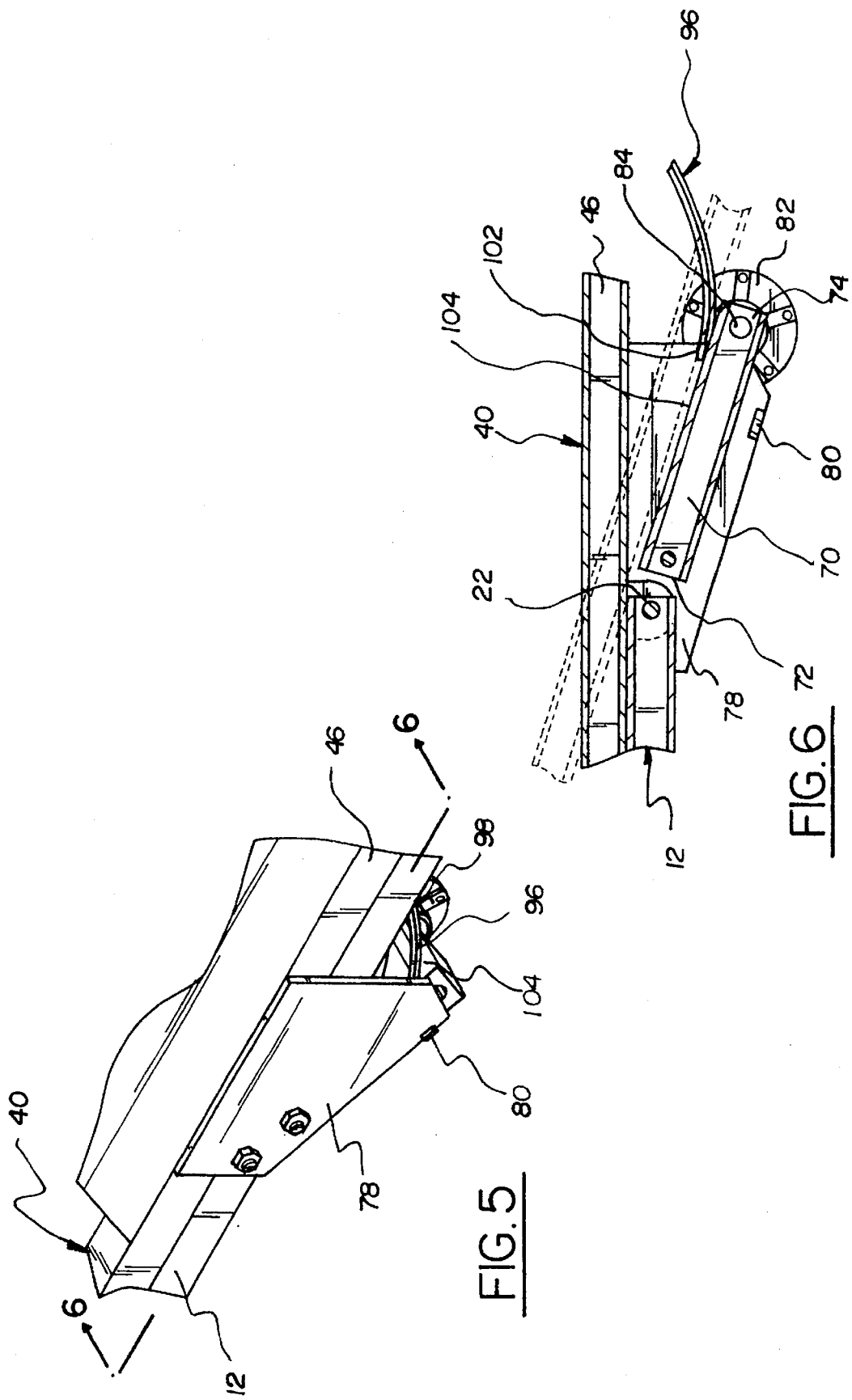

TRAILER FRAME AND INDEPENDENT WHEELS

BACKGROUND OF THE INVENTION

1. Field of the Invention

The present invention relates to a trailer frame and independent wheels and more particularly pertains to a trailer frame with a wheel assembly that can accommodate an independent trailer bed, and further able to raise, lower and transport the trailer bed.

2. Description of the Prior Art

The use of trailers is known in the prior art. More specifically, trailers heretofore devised and utilized for the purpose of transporting items, such as equipment are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,308,213 to Gilbertson discloses a ground level loading universal trailer. U.S. Pat. No. 5,362,195 to Wagner discloses a tilting trailer for a motorcycle. U.S. Pat. Des. 331,207 to Phelps discloses a trailer. U.S. Pat. No. 4,659,100 to Welker discloses a trailer. U.S. Pat. No. 4,685,855 to Giullano discloses a universal trailer. Lastly, U.S. Pat. No. 4,395,185 to Whaley discloses a self-leveling boat trailer.

While these devices fulfill their respective, particular objectives and requirements, the aforementioned patents do not describe trailer frame and independent wheels that allows the trailer bed, positioned within the two frames, to be operated as a tilt-bed for loading or un loading cargo.

In this respect, the trailer frame and independent wheels according to the present invention substantially departs from the conventional concepts and designs of the prior art, and in doing so provides an apparatus primarily developed for the purpose of providing a trailer frame with a wheel assembly that can accommodate an independent trailer bed, and further able to raise, lower and transport the trailer bed.

Therefore, it can be appreciated that there exists a continuing need for a new and improved trailer frame and independent wheels which can be used for providing a trailer frame with a wheel assembly that can accommodate an independent trailer bed, and further able to raise, lower and transport the trailer bed. In this regard, the present invention substantially fulfills this need.

SUMMARY OF THE INVENTION

In view of the foregoing disadvantages inherent in the known types of trailers now present in the prior art, the present invention provides an improved trailer frame and independent wheels. As such, the general purpose of the present invention, which will be described subsequently in greater detail, is to provide a new and improved trailer frame and independent wheels and method which has all the advantages of the prior art and none of the disadvantages.

To attain this, the present invention essentially comprises a stationary frame member. The stationary frame member has a front bar and a pair of side bars. Each side bar has a free end. The front bar has a front side with a tongue assembly fixedly attached and a back side with a pair of trailer bed stops. The tongue assembly has a trailer hitch member. A movable frame member is positioned juxtapose the stationary frame member. The movable frame has a front bar and a pair of side bars. A pair of vertical supports are spaced apart and project upwardly from an upper side of the movable frame member. One of each of the vertical supports is attached at a corner of the movable frame. One of the vertical supports has a crank, while another of the vertical supports has a cable anchor. Each side bar of the movable frame has a rear end with an end projection extending downwardly. A pair of wheel assemblies are provided. One of each wheel assembly is attached to one of the side bars of the movable frame member. Each wheel assembly has an axle arm with an interior end and an exterior end. The interior end is coupled between a pair of axle plates. The pair of axle plates are welded to the movable frame member and rotatably coupled to the free end of the stationary frame. A hub of each wheel assembly has a hub axle positioned within the axle arm and adjacent the exterior end. The hub of each wheel assembly is capable of supporting a tire rim with a tire. Included are a pair of elongated suspension bands. Each suspension band has an upper end and a lower end. Each side bar of the movable frame has the upper end of one of the suspension bands bolted to and under side. While the lower end of the one band is welded to an upper side of the axle arm. The pair of elongated suspension bands allow the movable frame member to rock up and down about the axle plate and with respect to the stationary frame member. A trailer bed is included. The trailer bed has a pair of short sides with a pair of long sides therebetween. The trailer bed has a platform mounted onto the short sides and the long sides. The trailer bed has a pair of front corners formed at one of the short sides. Each front corner has a roller. The trailer bed is positioned between the pair of sides of the stationary frame when the movable frame is positioned juxtapose the stationary frame. Lastly, a pair of support rods are positioned within a back end of another of the short sides of the trailer bed. The trailer bed is supported at the front corners by the movable frame with a cable that runs from the cable anchor through each roller to couple with the crank. The back end of the trailer bed is supported by the movable frame when the support rods are positioned within the end projections of the movable frame, simultaneously with each back end. Whereby, when the trailer bed is supported by the movable frame items on the trailer bed may be transported.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer frame and independent wheels which has all of the advantages of the prior art Trailers and none of the disadvantages.

It is another object of the present invention to provide a new and improved trailer frame and independent wheels which may be easily and efficiently manufactured and marketed.

It is further object of the present invention to provide a new and improved trailer frame and independent wheels which is of durable and reliable constructions.

An even further object of the present invention is to provide a new and improved trailer frame and independent wheels which is susceptible of a low cost of manufacture with regard to both materials and labor, and which accordingly is then susceptible of low prices of sale to the consuming public, thereby making such trailer frame and independent wheels economically available to the buying public.

Still yet another object of the present invention is to provide a new and improved trailer frame and independent wheels which provides in the apparatuses and methods of the prior art some of the advantages thereof, while simultaneously overcoming some of the disadvantages normally associated therewith.

Even still another object of the present invention is to provide a trailer frame and independent wheels for providing a trailer frame with a wheel assembly that can accommodate an independent trailer bed, and further able to raise, lower and transport the trailer bed.

Lastly, it is an object of the present invention to provide a new and improved trailer frame and independent wheels including a stationary frame member with a tongue assembly attached and a pair of side bars with each side bar having a free end. Included is a movable frame member being positionable juxtapose the stationary frame member. The movable frame has a front bar and a pair of side bars and each side bar has a rear end. A pair of vertical supports project upwardly from an upper side of the movable frame member. A pair of wheel assemblies, with one each attached to one of the side bars of the movable frame member. Each wheel assembly having an axle arm with an interior end that is coupled between a pair of axle plates. The pair of axle plates are welded to the movable frame member and coupled to the free end of the stationary frame. A hub of each wheel assembly supports a tire rim with a tire. A pair of elongated suspension bands are provided. Each has an upper end bolted to the side bare of the movable frame and a lower end welded to the axle arm.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the trailer frame and independent wheels constructed in accordance with the principles of the present invention.

FIG. 2 is a side elevational view of the present invention in a operable configuration with the trailer bed.

FIG. 5 is an isometric view of a portion of the wheel assembly of the present invention.

FIG. 6 is a cross sectional view of the operable components of the wheel assembly of the present invention.

The same reference numerals refer to the same parts through the various Figures.

DESCRIPTION OF THE PREFERRED EMBODIMENT

Figure 4:
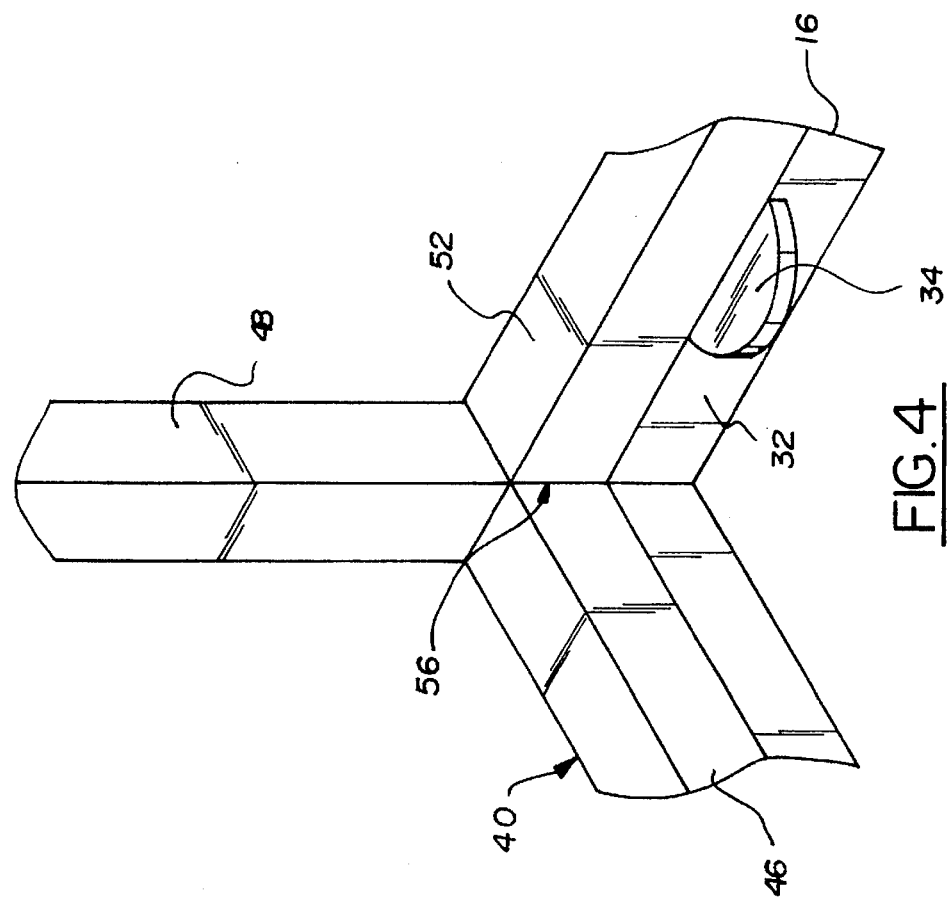
FIG. 4 is an enlarged cutaway view of the attachment of the side bars and the front bars of the trailer frame taken at position 4 of FIG. 1.
Figure 3:
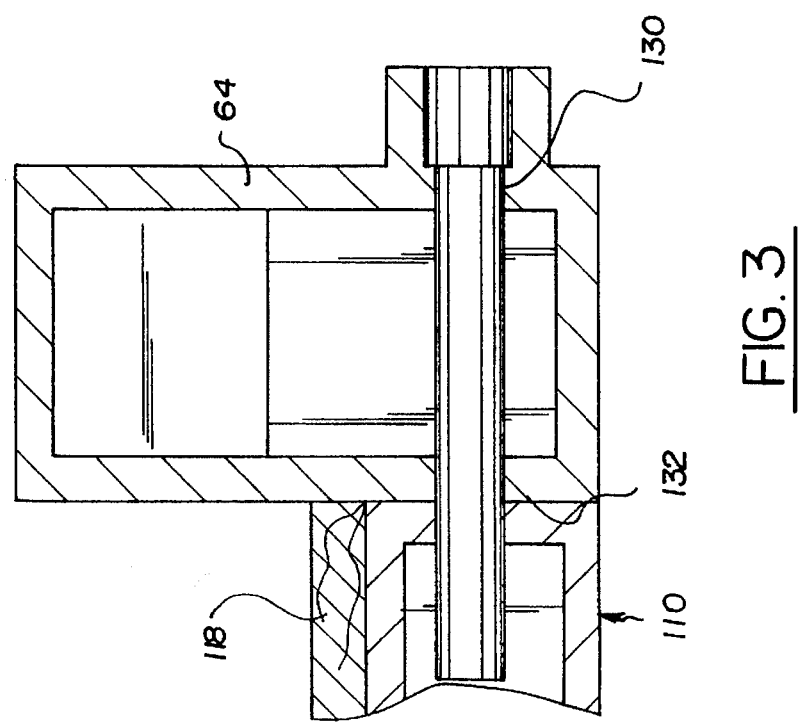
FIG. 3 is an enlarged cross-sectional view of the coupling of the trailer bed and movable frame with the supporting rod taken along 3—3 of FIG. 2.
Figure 7:
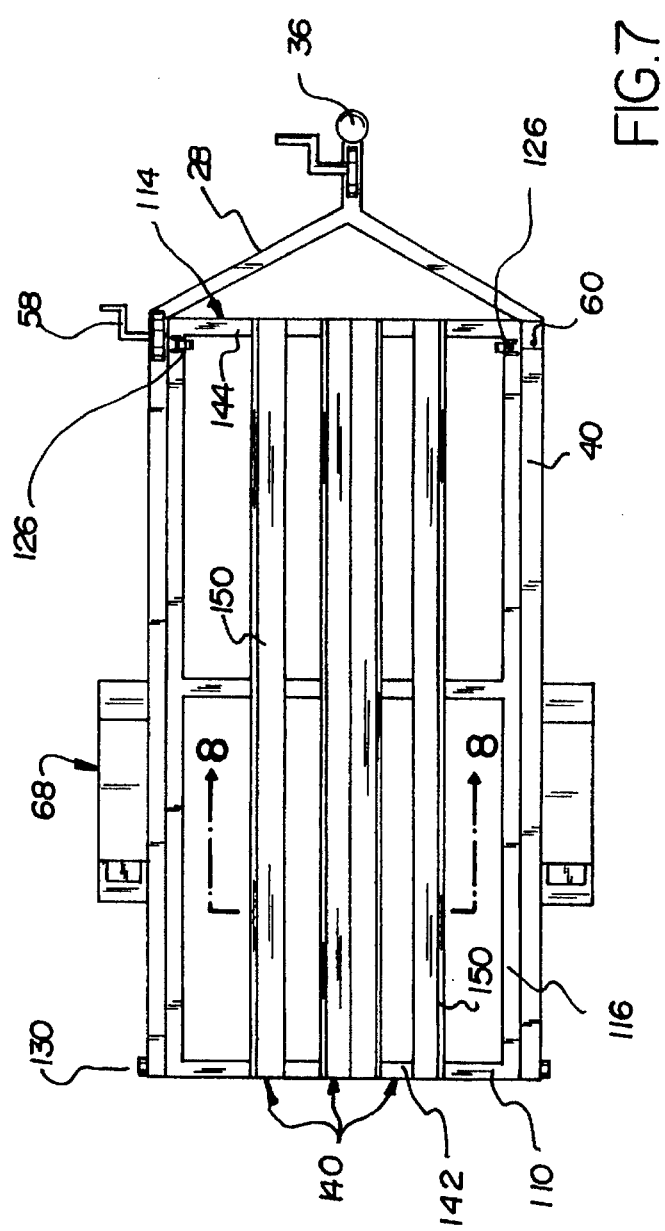
FIG. 7 is a perspective view of the preferred embodiment of the trailer frame and independent wheels with a bunk bed type trailer bed being supported.
Figure 8:
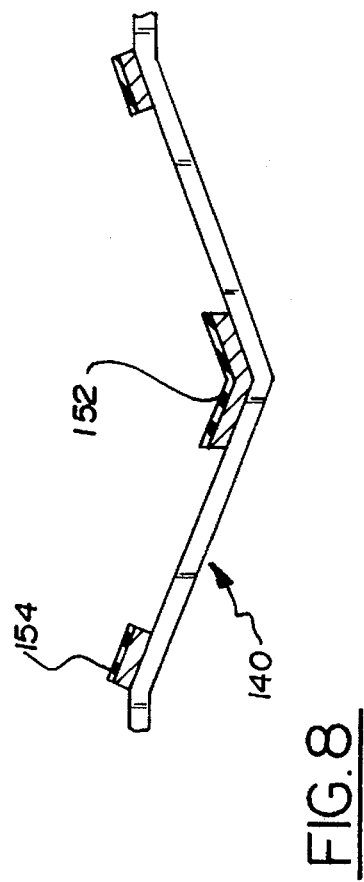
FIG. 8 is a cross sectional view of the operable components of the bunk bed taken along lines 8—8 of FIG. 7.

With reference now to the drawings, and in particular to FIG. 1 thereof, the preferred embodiment of the new and improved Trailer frame and independent wheels embodying the principles and concepts of the present invention and generally designated by the reference numeral 10 will be described.

The present invention, the Trailer frame and independent wheels 10 is comprised of a plurality of components. Such components in their broadest context include a stationery frame, a movable frame and a trailer bed. Such components are individually configured and correlated with respect to each other so as to attain the desired objective.

Specifically, the present invention includes a stationary frame member 12. The stationary frame member has a front bar 16 and a pair of side bars 18. Each side bar has a free end 22. The stationary frame is U-shaped, as seen in FIG. 1. The front bar has a front side 24 with a tongue assembly 28 fixedly attached. The front bar, as shown in FIG. 4, has a back side 32 with a pair of trailer bed stops 24. The tongue assembly has a trailer hitch member 36, as shown in FIG. 2.

As best illustrated in FIG. 1, a movable frame member 40 is positioned juxtapose the stationary frame member 12. The movable frame is U-shaped. The movable frame having a front bar 44 and a pair of side bars 46. The side bars of the movable frame extend beyond the free end of the side bars of the stationary frame. A pair of vertical supports 48 are spaced apart and project upwardly from an upper side 52 of the movable frame member. One of each of the vertical supports is attached at a corner 56 of the movable frame. FIG. 2, depicts one of the vertical supports with a crank, while another of the vertical supports has a cable anchor 60. Each side bar of the movable frame has a rear end 62 with an end projection 64 extending downwardly.

Also, a pair of wheel assemblies 68 are provided. One each is attached to one of the side bars 46 of the movable frame member. Each wheel assembly has an axle arm 70 with an interior end 72 and an exterior end 74. The interior end is coupled between a pair of axle plates 78. The axle plates are formed of a rigid material. The pair of axle plates are welded to the movable frame member, as shown in FIG. 5. The pair of axle plates are rotatably coupled to the free end of the stationary frame, as shown in FIG. 6. The pair of axle plates, on each side bar of the movable frame, straddles the free end of the stationary frame and has a flat bar 80. The flat bar stabilizes and strengthens the pair of axle plates.

Additionally, a hub 82 of each wheel assembly has a hub axle 84 positioned within the axle arm 70 and adjacent the exterior end. As shown in FIGS. 1 and 2, the hub of each wheel assembly 68 is capable of supporting a tire rim 86 with a tire 88. Welded to the upper side of each side bar of the movable frame is a tire cover 90. Each tire cover has a tail light 92 attached.

Included are a pair of elongated suspension bands 96. Each suspension band has an upper end 98 and a lower end 102. FIG. 6 shows the suspension band of each wheel assembly 68. Each side bar of the movable frame has the upper end of one of the suspension bands being bolted to an underside (not shown). The lower end of the one band, as shown in FIGS. 5 and 6 is welded to an upper side 104 of the axle arm. The pair of elongated suspension bands allow the movable frame member to rock up and down about the axle plate and with respect to the stationary frame member, as shown in FIG. 2. The flat bar helps shore up the axle are as the band is compressed by the movement of the movable frame member.

A trailer bed 110 is supportable by the two frames, the movable frame member and the stationary frame member. The trailer bed has a pair of short sides 114 with a pair of long sides 116 therebetween. The trailer bed has a platform 118 that is mounted onto the short sides and the long sides, as seen in FIG. 1. The platform is made of a rigid material. One of the short sides of the trailer bed, nearest the front bar of the stationary frame, has a bracket 122. The bracket allows the front bar to be seated within when the trailer is held by the two frames. The trailer bed has a pair of front corners 124 that are formed at one of the short sides. Each front corner has a roller 126. Each roller is coupled to its respective front corner. The trailer bed is positionable between the pair of sides of the stationary frame when the movable frame is positioned juxtapose.

Lastly, a pair of support rods 130 are positionable within a back ends 132 of another of the short sides of the trailer bed. The trailer bed is supported, at the front corners 124 by the movable frame, when a cable 134 is run from the cable anchor 60 through each roller to couple with the crank 58. The crank is rotated to hoist the trailer bed into a parallel position with the stationary frame. The back end of the trailer bed is supported by the movable frame when the support rods are positioned within the end projections of the movable frame. The back end and the end projections hold the support rods simultaneously. Whereby, when the trailer bed is supported by the movable frame, items on the trailer bed may be transported.

Furthermore, the trailer bed 110 may have an elongated bunk bed 140 instead of the platform. The elongated bunk bed has a first end 142 and a second end 144. The first end of the bunk bed is attached to one of the short sides the trailer bed. The second end of the bunk bed is attached to another short side of the trailer bed. The bunk bed is V-shaped and has a center member 148 and a pair of outer members 150 parallel to the center member. The center member has a plurality of risers 152. Each outer member of the bunk bed has a plurality of rubber pads 154. The rubber pads are proportionately spaced its respective outer member. Whereby, when the trailer bed is supported by the movable frame a boat may be positioned within the bunk bed and transported.

The present invention is a trailer frame and independent wheels that is built from square steel tubing and assorted hardware. The trailer frame has a stationary frame member and a movable frame member. The two frame members will accommodate a platform type trailer bed or a bunk bed type trailer bed. The present invention has a trailer hitch to allow transport of the trailer frame by a car, truck or tractor. The trailer bed is lifted and lowered through the use of a winch/pulley system mounted at the front of the movable frame member. Two support rods at the back of the movable frame and the two pulleys at the front are removed in order to remove the trailer bed from the two frames. A 12-volt winch and double pulleys can be added to increase the lift capacity. Tandem wheels can also be applied. The present invention is well suited to a variety of applications, from advertising sign set-ups and removals, to transporting work materials, recreational vehicles, and hauling garden and farm equipment. Finally, the movable frame and stationary frame members will accommodate an trailer bed structured to support a boat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer frame and independent wheels comprising in combination:

a stationary frame member having a front bar and a pair of side bars with each side bar having a free end, the front bar having a front side with a tongue assembly fixedly attached thereto and a back side with a pair of trailer bed stops, the tongue assembly having a trailer hitch member;

a movable frame member being positionable juxtapose the stationary frame member, the movable frame having a front bar and a pair of side bars, a pair of vertical supports being spaced apart and projecting upwardly from an upper side of the movable frame member, one of each of the vertical supports being attached at a corner of the movable frame, one of the vertical supports having a crank, while another of the vertical supports having a cable anchor, each side bar of the movable frame having a rear end with an end projection extending downwardly therefrom;

a pair of wheel assemblies with one each being attached to one of the side bars of the movable frame member, each wheel assembly having an axle arm with an interior end and an exterior end, the interior end being coupled between a pair of axle plates, the pair of axle plates being welded to the movable frame member and rotatably coupled to the free end of the stationary frame;

a hub of each wheel assembly having a hub axle positioned within the axle arm adjacent the exterior end, the hub of each wheel assembly being capable of supporting a tire rim with a tire thereon;

a pair of elongated suspension bands with each having an upper end and a lower end, each side bar of the movable frame having the upper end of one of the suspension bands being bolted thereto, while the lower end of the one band is welded to an upper side of the axle arm, the pair of elongated suspension bands allow the movable frame member to rock up and down about the axle plate and with respect to the stationary frame member;

a trailer bed having a pair of short sides with a pair of long sides therebetween, the trailer bed having a platform being mounted onto the short sides and the long sides, the trailer bed having a pair of front corners being formed at one of the short sides, each front corner having a roller coupled thereto, the trailer bed being positionable between the pair of sides of the stationary frame when the movable frame being positioned juxtapose thereto; and a pair of support rods being positionable within a back end of another of the short sides of the trailer bed, the trailer bed being supported at the front corners by the movable frame with a cable running from the cable anchor through each roller to couple with the crank, the back end of the trailer bed being supported by the movable frame when the support rods being positionable within the end projections of the movable frame simultaneously with each back end thereof, whereby when the trailer bed being supported by the movable frame items on the trailer bed may be transported.

2. A trailer frame and independent wheels comprising:

a stationary frame member having a front bar with a tongue assembly attached and a pair of side bars with each side bar having a free end;

a movable frame member being positionable juxtapose the stationary frame member, the movable frame having a front bar and a pair of side bars with each side bar having a rear end, a pair of vertical supports projecting upwardly from an upper side of the movable frame member;

a pair of wheel assemblies with one each being attached to one of the side bars of the movable frame member, each wheel assembly having an axle arm with an interior end being coupled between a pair of axle plates, the pair of axle plates being welded to the movable frame member and rotatably coupled to the free end of the stationary frame;

a hub of each wheel assembly being capable of supporting a tire rim with a tire thereon; and a pair of elongated suspension bands with each having an upper end and a lower end, each side bar of the movable frame having the upper end of one of the suspension bands being bolted thereto, while the lower end of the one band is welded to an upper side of the axle arm.

3. The trailer frame and independent wheels as set forth in claim 2, wherein the front bar having a front side with a tongue assembly fixedly attached thereto and a back side with a pair of trailer bed stops, and the tongue assembly having a trailer hitch member.

4. The trailer frame and independent wheels as set forth in claim 2, wherein one of each of the vertical supports being attached at a corner of the movable frame, and one of the vertical supports having a crank while another of the vertical supports having a cable anchor.

5. The trailer frame and independent wheels as set forth in claim 2, wherein the rear end of each side bar of the movable frame having an end projection extending downwardly therefrom.

6. The trailer frame and independent wheels as set forth in claim 2, wherein the hub having a hub axle positioned within the axle arm adjacent the exterior end of the axle arm for supporting the tire rim.

7. The trailer frame and independent wheels as set forth in claim 2, wherein the pair of elongated suspension bands allow the movable frame member to rock up and down about the axle plate and with respect to the stationary frame member.

8. The trailer frame and independent wheels as set forth in claim 7 further including a trailer bed having a platform being mounted onto a pair of short sides and a pair of long sides thereof, the trailer bed being positionable between the pair of sides of the stationary frame when the movable frame being positioned juxtapose thereto, whereby when the trailer bed being supported by the movable frame items on the trailer bed may be transported.

9. The trailer frame and independent wheels as set forth in claim 8, wherein the trailer bed having a pair of front corners being formed at one of the short sides and each front corner having a roller coupled thereto.

10. The trailer frame and independent wheels as set forth in claim 9 further including a pair of support rods being positionable within a back end of another of the short sides of the trailer bed.

11. The trailer frame and independent wheels as set forth in claim 10, wherein the trailer bed being supported at the front corners by the movable frame with a cable running from the cable anchor through each roller to couple with the crank, and the back end of the trailer bed being supported by the movable frame when the support rods being positionable within the end projections of the movable frame simultaneously with each back end thereof.

12. A trailer frame and independent wheels comprising in combination:

a stationary frame member having a front bar and a pair of side bars with each side bar having a free end, the front bar having a front side with a tongue assembly fixedly attached thereto and a back side with a pair of trailer bed stops, the tongue assembly having a trailer hitch member;

a movable frame member being positionable juxtapose the stationary frame member, the movable frame having a front bar and a pair of side bars, a pair of vertical supports being spaced apart and projecting upwardly from an upper side of the movable frame member, one of each of the vertical supports being attached at a corner of the movable frame, one of the vertical supports having a crank, while another of the vertical supports having a cable anchor, each side bar of the movable frame having a rear end with an end projection extending downwardly therefrom;

a pair of wheel assemblies with one each being attached to one of the side bars of the movable frame member, each wheel assembly having an axle arm with an interior end and an exterior end, the interior end being coupled between a pair of axle plates, the pair of axle plates being welded to the movable frame member and rotatably coupled to the free end of the stationary frame;

a hub of each wheel assembly having a hub axle positioned within the axle arm adjacent the exterior end, the hub of each wheel assembly being capable of supporting a tire rim with a tire thereon;

a pair of elongated suspension bands with each having an upper end and a lower end, each side bar of the movable frame having the upper end of one of the suspension bands being bolted to an underside of the movable frame, while the lower end of the one band is welded to an upper side of the axle arm, the pair of elongated suspension bands allow the movable frame member to rock up and down about the axle plate and with respect to the stationary frame member; and a trailer bed having a pair of short sides with a pair of long sides therebetween, the trailer bed having an elongated bunk bed having a first end and a second end, the first end of the bunk bed being attached to one of the short sides the trailer bed, the second end of the bunk bed being attached to another short side of the trailer bed, the trailer bed having a pair of front corners being formed at one of the short sides, each front corner having a roller coupled thereto, the trailer bed being positionable between the pair of sides of the stationary frame when the movable frame being positioned juxtapose thereto, whereby when the trailer bed being supported by the movable frame a boat may positioned within the bunk bed and transported.

13. The trailer frame and independent wheels as set forth in claim 11, further including a pair of support rods being positionable within a back end of another of the short sides of the trailer bed.

14. The trailer frame and independent wheels as set forth in claim 13, wherein the trailer bed being supported at the front corners by the movable frame with a cable running from the cable anchor through each roller to couple with the crank.

15. The trailer frame and independent wheels as set forth in claim 14 wherein the back end of the trailer bed being supported by the movable frame when the support rods being positionable within the end projections of the movable frame simultaneously with each back end thereof.

* * * * *